US011306822B2

(12) United States Patent
Suzuki

(10) Patent No.: US 11,306,822 B2
(45) Date of Patent: *Apr. 19, 2022

(54) SEALING DEVICE

(71) Applicant: NOK CORPORATION, Tokyo (JP)

(72) Inventor: Atsushi Suzuki, Fukushima (JP)

(73) Assignee: NOK CORPORATION (*) Notice: Subject to any disclaimer, the term of this patent is extended or adjusted under 35 U.S.C. 154(b) by 0 days.

This patent is subject to a terminal disclaimer.

(21) Appl. No.: 17/043,459

(22) PCT Filed: Jun. 25, 2019

(86) PCT No.: PCT/JP2019/025061
§ 371 (c)(1),
(2) Date: Sep. 29, 2020

(87) PCT Pub. No.: WO2020/021935
PCT Pub. Date: Jan. 30, 2020

(65) Prior Publication Data
US 2021/0131567 A1 May 6, 2021

(30) Foreign Application Priority Data
Jul. 25, 2018 (JP) .............................. JP2018-139777

(51) Int. Cl.
F16J 15/3224 (2016.01)
F16J 15/3284 (2016.01)
(Continued)

(52) U.S. Cl.
CPC ....... F16J 15/3224 (2013.01); F16J 15/3252 (2013.01); F16J 15/3284 (2013.01); F16J 15/363 (2013.01)

(58) Field of Classification Search
CPC .......... F16J 3/041; F16J 15/064; F16J 15/322; F16J 15/324; F16J 15/3224;
(Continued)

(56) References Cited

U.S. PATENT DOCUMENTS 5,332,234 A * 7/1994 Forch .................... F16J 15/3216
277/576
7,641,561 B2 * 1/2010 Moriyama ............... F16J 3/041
464/173
(Continued)

FOREIGN PATENT DOCUMENTS

JP H09242880 A 9/1997
JP 2004316795 A 11/2004
JP 201620721 A 2/2016

OTHER PUBLICATIONS

International Search Report issued in PCT/JP2019/025061 (in English and Japanese), dated Jul. 30, 2019; ISA/JP.
(Continued)

Primary Examiner — Nicholas L Foster
(74) Attorney, Agent, or Firm — Harness, Dickey & Pierce, P.L.C.

(57) ABSTRACT

A sealing device seals a gap between a housing and a rotational shaft located in a shaft hole provided in the housing. The sealing device includes: a mounted part that is to be mounted on the shaft hole; an inner annular part; a seal lip that is to be in contact with the outer peripheral surface of the rotational shaft; a bellows part connecting the mounted part with the inner annular part; a sound insulation ring fixed to the mounted part; and a circular annular sound insulation lip projecting from the inner annular part or the bellows part toward the sound insulation ring. The sound insulation lip protrudes obliquely radially outward. The sound insulation ring includes a circular annular part with which the distal end of the sound insulation lip is in contact. The circular annular part of the sound insulation ring is inclined with respect to an axial direction of the shaft hole such that the distance between an outer portion of the circular annular part and the inner annular part when projected in the axial direction of the shaft hole is greater than
(Continued)

the distance between an inner portion of the circular annular part and the inner annular part when projected in the axial direction.

4 Claims, 5 Drawing Sheets

(51) Int. Cl.
*F16J 15/3252* (2016.01)
*F16J 15/36* (2006.01)

(58) Field of Classification Search
CPC .. F16J 15/3248; F16J 15/3252; F16J 15/3268; F16J 15/3284; F16J 15/3232
See application file for complete search history.

(56) References Cited

U.S. PATENT DOCUMENTS

| | | | | |
|---|---|---|---|---|
| 7,677,577 | B2* | 3/2010 | Kanzaki | F16J 15/3284 |
| | | | | 277/551 |
| 9,689,496 | B2* | 6/2017 | Wilkins | F16J 15/3224 |
| 10,234,037 | B2* | 3/2019 | Kobayashi | F16J 15/52 |
| 10,442,919 | B2* | 10/2019 | Kobayashi | F16J 15/20 |
| 2005/0250586 | A1* | 11/2005 | Yamada | F16J 15/52 |
| | | | | 464/170 |
| 2008/0203673 | A1* | 8/2008 | Kanzaki | F16J 15/064 |
| | | | | 277/402 |
| 2008/0231003 | A1* | 9/2008 | Moriyama | F16J 3/041 |
| | | | | 277/636 |
| 2016/0186863 | A1* | 6/2016 | Wilkins | F16J 15/3248 |
| | | | | 384/477 |
| 2017/0219100 | A1* | 8/2017 | Kobayashi | F16J 15/3204 |
| 2017/0234434 | A1* | 8/2017 | Shuto | F16J 3/04 |
| | | | | 277/504 |
| 2017/0355838 | A1* | 12/2017 | Kobayashi | F16J 15/20 |
| 2018/0106373 | A1* | 4/2018 | Toth | F16J 15/3224 |
| 2021/0131561 | A1* | 5/2021 | Suzuki | G10K 11/16 |

OTHER PUBLICATIONS

Notice of Reasons for Refusal for corresponding Japanese Application No. 2020-532227 dated Oct. 6, 2021 with English translation (10 Pages).

Notice of Reasons for Refusal for related Japanese Application No. 2020-532226 dated Oct. 19, 2021 with English translation (10 Pages).

Notice of Reasons for Refusal for corresponding Japanese Application No. 2020-532227 dated Jan. 25, 2022, with English translation (7 Pages).

* cited by examiner

SEALING DEVICE

CROSS REFERENCE TO RELATED APPLICATIONS

This application is a U.S. National Phase Application under 35 U.S.C. 371 of International Application No. PCT/JP2019/025061 filed on Jun. 25, 2019, which claims the benefit of priority from Japanese Patent Application No. 2018-139777 filed Jul. 25, 2018. The entire disclosures of all of the above applications are incorporated herein by reference.

BACKGROUND

Technical Field

The present invention relates to sealing devices suitable for use as steering dust seals.

Related Art

A steering dust seal is disposed on a front dash panel, and a steering shaft is rotatably inserted into the steering dust seal (JP-A-2016-20721).

The steering dust seal has a function of reducing entry of foreign matter (dust, muddy water, etc.) from the engine compartment into the passenger compartment, and of reducing the transmission of sound from the engine compartment to the passenger compartment.

In order to reduce the transmission of sound, the steering dust seal disclosed in JP-A-2016-20721 includes a flange and a lip that is in slidable contact with the flange, in addition to a bellows part. The flange surrounds the steering shaft. The bellows, the flange, and the lip form a sealed space for damping sound.

In the steering dust seal having such a structure, it is desirable to be able to maintain the sealed space for a long period of time.

SUMMARY

Accordingly, the present invention provides a sealing device capable of maintaining a sealed space for attenuating sound for a long period of time.

A sealing device according to an aspect of the present invention is a sealing device for sealing a gap between a housing and a rotational shaft located in a shaft hole provided in the housing. The shaft has an axis. The sealing device includes: an annular mounted part that is to be mounted on an inner peripheral surface of the shaft hole; an inner annular part located radially inside of the mounted part; a seal lip extending from the inner annular part and for being in contact with the outer peripheral surface of the rotational shaft; a bellows part connecting the mounted part with the inner annular part; a sound insulation ring fixed to the mounted part and expanding radially inward from the mounted part, the sound insulation ring including an opening through which the rotational shaft passes; and a circular annular sound insulation lip projecting from the inner annular part or the bellows part toward the sound insulation ring and including a distal end being in slidable contact with the sound insulation ring. The sound insulation lip protrudes obliquely radially outward, and the sound insulation ring includes a circular annular part with which the distal end of the sound insulation lip is in contact. The circular annular part of the sound insulation ring is inclined with respect to an axial direction of the shaft hole such that a distance between an outer portion of the circular annular part and the inner annular part when projected to the axis of the shaft hole is greater than a distance between an inner portion of the circular annular part and the inner annular part when projected to the axis of the shaft hole.

In this aspect, the mounted part, the bellows part, the sound insulation ring, and the sound insulation lip define a sealed space for attenuating sound. When the rotational shaft is eccentric with respect to the shaft hole, the sound insulation ring does not move, whereas the sound insulation lip moves laterally following the rotational shaft. In this aspect, the circular annular part of the sound insulation ring is inclined with respect to an axial direction of the shaft hole such that a distance between an outer portion of the circular annular part and the inner annular part when projected to the axis of the shaft hole is greater than a distance between an inner portion of the circular annular part and the inner annular part when projected to the axis of the shaft hole. Accordingly, when a portion of the distal end of the sound insulation lip moves from the inside to the outside in a radial direction, the sliding resistance of the portion of the sound insulation lip against the circular annular part of the sound insulation ring gradually decreases, and the sound insulation lip smoothly slides on the circular annular part without being folded in an unexpected orientation. Conversely, when a portion of the distal end of the sound insulation lip moves from the outside to the inside in a radial direction, the sound insulation lip is gradually bent by the circular annular part, and this portion does not separate from the circular annular part, so that the sealed space is not open. In any case, therefore, the distal end of the sound insulation lip can be permanently in contact with the circular annular part of the sound insulation ring and maintain the sealed space for attenuating sound for a long period of time.

Preferably, the sound insulation ring further includes a protruding wall disposed radially inside of the circular annular part, the protruding wall protruding toward the inner annular part.

In this case, a protruding wall is disposed radially inside the circular annular part of the sound insulation ring and radially outside the opening, and the protruding wall restricts excessive lateral movement of the sound insulation lip, so as to prevent a part of the sound insulation lip from reaching the opening to open the sealed space. Thus, the distal end of the sound insulation lip can be permanently in contact with the circular annular part of the sound insulation ring and maintain the sealed space for attenuating sound for a long period of time.

Preferably, irregular convexities and concavities are formed in a portion of the sound insulation ring with which the distal end of the sound insulation lip is in contact. In this case, since the sound insulation lip formed of an elastic material is unlikely to adhere to the sound insulation ring, the sound insulation lip can slide on the sound insulation ring without receiving large resistance due to friction.

DETAILED DESCRIPTION

Hereinafter, with reference to the accompanying drawings, multiple embodiments according to the present invention will be described.

First Embodiment

Figure 1:
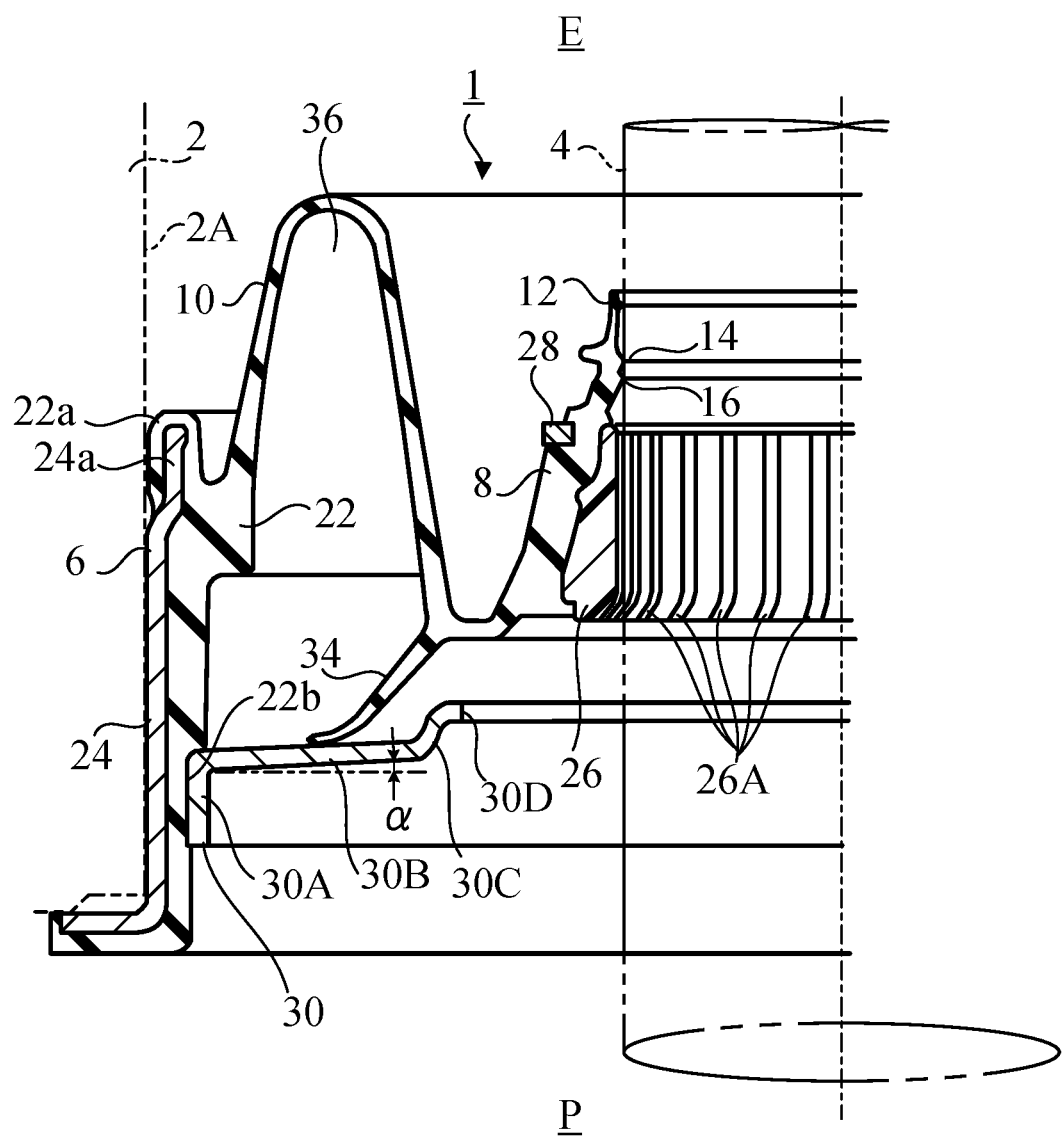
FIG. 1 is a cross-sectional view showing a sealing device according to a first embodiment of the present invention.

As shown in FIG. 1, a sealing device 1 according to a first embodiment of the present invention is a steering dust seal for sealing a gap between a housing (front dash panel) 2 and a rotational shaft (steering shaft) 4 located in a shaft hole 2A provided in the housing 2. The sealing device 1 is an annular component, of which the left half is shown in FIG. 1. In FIG. 1, the symbol E indicates a space on the engine compartment side, and P indicates a space on the passenger compartment side. Thus, the top and bottom of the drawing is opposite to the top and bottom of the sealing device in use.

The sealing device 1 is basically a highly elastic component made of an elastic material, e.g. an elastomer, and includes an annular mounted part 6 that is to be mounted on the inner peripheral surface of the shaft hole 2A, an inner annular part 8 located radially inside the mounted part 6, and a folded bellows part 10 connecting the mounted part 6 with the inner annular part 8.

Furthermore, the sealing device 1 includes multiple seal lips 12, 14, and 16 extending from the inner annular part 8 and for being in contact with the outer peripheral surface of the rotational shaft 4 over the entire circumference. As shown, the seal lips 12, 14, and 16 are elastically deformed since they are in contact with the rotational shaft 4. In this embodiment, three seal lips 12, 14, and 16 are provided, but the number of seal lips is not limited to the embodiment, and may be one, two, or four or more. The inner annular part 8, the bellows part 10 and the seal lips 12, 14, and 16 are formed of an elastic material, for example, an elastomer.

The mounted part 6 includes an elastic ring 22 made of an elastic material, for example, an elastomer, and a rigid ring 24 made of a rigid material, for example, a metal, fixed around the elastic ring 22. The rigid ring 24 is engaged (press fit) into the shaft hole 2A. In the rigid ring 24, one end 24a has a smaller diameter than other portions, and a portion 22a of the elastic ring 22 is disposed around the entire circumference of the end 24a. The portion 22a is compressed between the end 24a of the rigid ring 24 and the housing 2, sealing the gap between the mounted part 6 and the housing 2.

The rotational shaft 4 is a steering shaft provided in a tilt steering mechanism. Therefore, the rotational shaft 4 can be eccentric because it is swung by the driver. The bellows part 10 is a portion that is easily elastically deformed, and is provided so as to allow the movement, i.e., the eccentricity, of the rotational shaft 4 by means of the elastic deformation thereof, and to allow the seal lips 12, 14, and 16 to be in contact with the outer peripheral surface of the rotational shaft 4 over the entire circumference.

Furthermore, the sealing device 1 includes an annular sliding member 26 that is arranged inside the inner circular annular part 8 and is fixed to the inner circular annular part 8. The sliding member 26 may be fixed to the inner annular part 8 by, for example, engaging a convex portion formed on the outer peripheral surface of the sliding member 26 into a recess formed on the inner peripheral surface of the inner annular part 8. However, the scheme for fixing the sliding member 26 to the inner annular part 8 is not limited.

Figure 2:
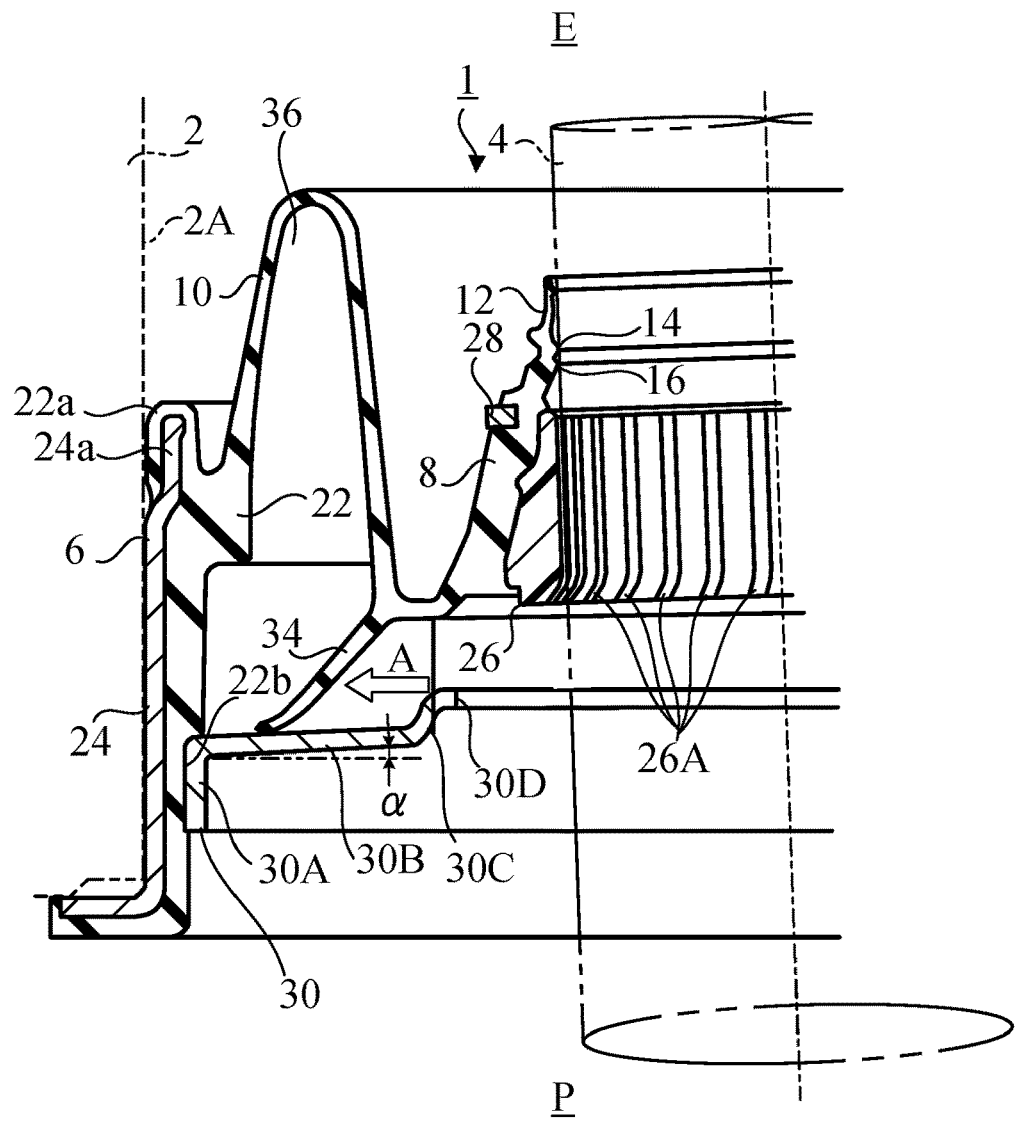
FIG. 2 is a cross-sectional view showing the sealing device according to the first embodiment when the rotational shaft is swung.
Figure 4:
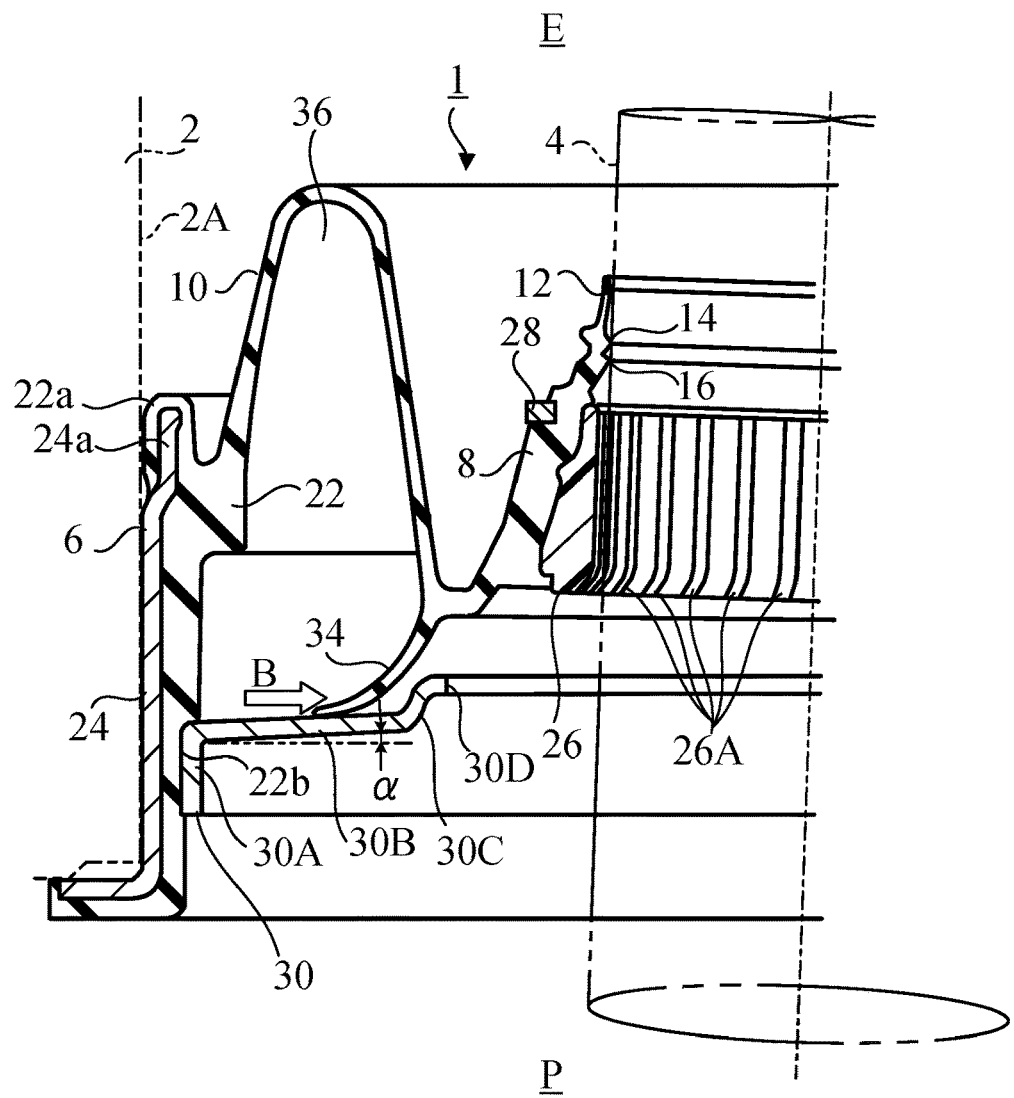
FIG. 4 is a cross-sectional view showing the sealing device according to the first embodiment when the rotational shaft is swung in a direction opposite to that of FIG. 2.

The sliding member 26 is provided so that the seal lips 12, 14, and 16 can be in contact with the outer peripheral surface of the rotational shaft 4 over the entire circumference even when the rotational shaft 4 is eccentric. Specifically, as shown in FIGS. 2 and 4, when the rotational shaft 4 is swung, the sliding member 26 around the rotational shaft 4 is moved following the movement of the rotational shaft 4. Since the seal lips 12, 14, and 16 are located in stationary positions relative to the sliding member 26, they are also located in stationary positions relative to the rotational shaft 4. Therefore, the seal lips 12, 14, and 16 can be maintained in contact with the outer peripheral surface of the rotational shaft 4 over the entire circumference.

Thus, when the rotational shaft 4 rotates, the outer peripheral surface of the rotational shaft 4 slides on the inner peripheral surface of the sliding member 26. The sliding member 26 is made of a resin having a lower coefficient of friction, such as polytetrafluoroethylene that is harder than elastomers. Therefore, even when the rotational shaft 4 rotates, abnormal noise, which may be caused by friction between the outer peripheral surface of the rotational shaft 4 and the inner peripheral surface of the sliding member 26, is prevented from being generated Although not necessary, grooves 26A for retaining grease are formed on the inner peripheral surface of the sliding member 26. The grease further reduces the friction between the outer peripheral surface of the rotational shaft 4 and the inner peripheral surface of the sliding member 26.

Although not necessary, the sealing device 1 includes a reinforcing ring 28 embedded in the inner circular annular part 8. The reinforcing ring 28 is made of a rigid material, for example, metal, and suppresses the deformation of the inner annular part 8 so that each of the seal lips 12, 14, and 16 can be in contact with the rotational shaft 4 in a stable orientation.

In addition, the sealing device 1 includes a sound insulation ring 30. The sound insulation ring 30 is fixed to the mounted part 6, and expands radially inward from the mounted part 6. The sound insulation ring 30 is provided to block the transmission of sound from the space E on the engine compartment side to the space P on the passenger compartment side, and the material thereof is not limited. However, it is preferable that the sound insulation ring 30 be formed of a rigid material, for example, resin or metal, in order to maintain a sealed space described later.

The sound insulation ring 30 is disposed at a location distant away from the bellows part 10, and includes an outer cylindrical part 30A, a circular annular part 30B, a protruding wall 30C, and an opening 30D. The outer cylindrical part 30A is fitted into and fixed to a portion 22b of the inner peripheral surface of the elastic ring 22 of the mounted part 6. The circular annular part 30B expands radially inward from the outer cylindrical part 30A. In this embodiment, the circular annular part 30B is inclined with respect to the axial direction of the shaft hole 2A, such that the inner portion of the circular annular part 30B is disposed at a higher level than the outer portion in FIG. 1, that is, closer to the bellows part 10 than the inner portion. The circular annular part 30B intersects with a plane perpendicular to the axial direction of the shaft hole 2A at an inclination angle α. The protruding wall 30C is disposed radially inside the circular annular part 30B and protrudes upward in FIG. 1, that is, toward the inner annular part 8. The opening 30D is formed at the center of the sound insulation ring 30, and the rotational shaft 4 passes through the inside of the opening 30D. The diameter of the opening 30D is large enough to allow the rotational shaft 4 to swing.

The protruding wall 30C is disposed radially outside the opening 30D. In this embodiment, the protruding wall 30C has a folded shape.

Such a sound insulation ring 30 can be formed by, for example, pressing a sheet metal. Alternatively, the sound insulation ring 30 may be formed from a resin material by injection molding or press molding.

In addition, the sealing device 1 includes a circular annular sound insulation lip 34 made of an elastic material, for example, elastomer. In this embodiment, the sound insulation lip 34 protrudes from the connecting portion of the inner annular part 8 and the bellows part 10 toward the sound insulation ring 30. However, the sound insulation lip 34 may protrude from the inner annular part 8 toward the sound insulation ring 30, or may protrude from the bellows part 10 toward the sound insulation ring 30.

The sound insulation lip 34 protrudes obliquely radially outward, and the distal end of the sound insulation lip 34 is in slidable contact with the circular annular part 30B of the sound insulation ring 30 without a gap.

The mounted part 6, the bellows part 10, the sound insulation ring 30, and the sound insulation lip 34 define a sealed space 36 for attenuating sound. As shown in FIGS. 2 and 4, when the rotational shaft 4 swings and is eccentric with respect to the shaft hole 2A, the sound insulation ring 30 does not move, whereas the sound insulation lip 34 moves laterally following the rotational shaft 4.

As described above, since the circular annular part 30B of the sound insulation ring 30 is inclined with respect to the axial direction of the shaft hole 2A, the distance between the outer portion of the circular annular part 30B and the inner annular part 8 when projected to the axis of the shaft hole 2A is greater than the distance between the inner portion of the circular annular part 30B and the inner annular part 8 when projected to the axis of the shaft hole 2A. Accordingly, as shown in FIG. 2, when the sound insulation lip 34 moves in the direction of arrow A (when a portion of the distal end of the sound insulation lip 34 moves from the inside to the outside in a radial direction), the sliding resistance of the portion of the sound insulation lip 34 against the circular annular part 30B of the sound insulation ring 30 gradually decreases, and the sound insulation lip 34 smoothly slides on the circular annular part 30B without being folded in an unexpected orientation such that the curvature of the sound insulation lip 34 gradually decreases. Thus, the distal end of the sound insulation lip 34 can continue to be in contact with the circular annular part 30B of the sound insulation ring 30 to maintain the sealed space 36 for attenuating sound.

Figure 3:
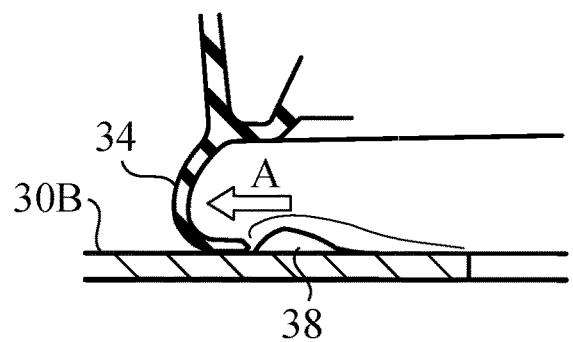
FIG. 3 is a cross-sectional view of a sealing device showing a problem in a comparative example.

FIG. 3 is a cross-sectional view of another sealing device showing a problem in a comparative example. In this comparative example, the circular annular part 30B lies on a plane perpendicular to the axial direction of the shaft hole 2A without being inclined. In this comparative example, when the sound insulation lip 34 moves in the direction of arrow A (when a portion of the distal end of the sound insulation lip 34 moves from the inside to the outside in a radial direction), the portion of the sound insulation lip 34 is folded in an unexpected orientation for the sliding resistance, and other portions are also affected by this and are deformed, and as a result, a gap 38 may be generated between the sound insulation lip 34 and the circular annular part 30B. When the gap 38 occurs, the space 36 is not hermetically sealed, so that the sound attenuating effect is weakened. This embodiment is capable of suppressing such a problem.

On the other hand, as shown in FIG. 4, when the sound insulation lip 34 moves in the direction of arrow B (when a portion of the distal end of the sound insulation lip 34 moves from the outside to the inside in a radial direction), opposite to FIG. 2, the sound insulation lip 34 is gradually bent by the circular annular part 30B, and the sealed space 36 is not open without the portion being separated from the circular annular part 30B.

In addition, since the protruding wall 30C is disposed radially inside the circular annular part 30B of the sound insulation ring 30 and radially outside the opening 30D, when the sound insulation lip 34 moves in the direction of arrow B, the protruding wall 30C restricts excessive lateral movement of the sound insulation lip 34, so as to prevent a part of the sound insulation lip 34 from reaching the opening 30D to open the sealed space 36.

Therefore, regardless of the direction in which the sound insulation lip 34 moves, the distal end of the sound insulation lip 34 can be permanently in contact with the circular annular part 30B of the sound insulation ring 30, and the sealed space 36 for attenuating sound can be maintained for a long period of time. In addition, since a part of the sound insulation lip 34 is restricted from reaching the opening 30D, the size of the opening 30D, and thus, the shape of the rotational shaft 4, can be more freely designed than in the conventional art.

Figure 5:
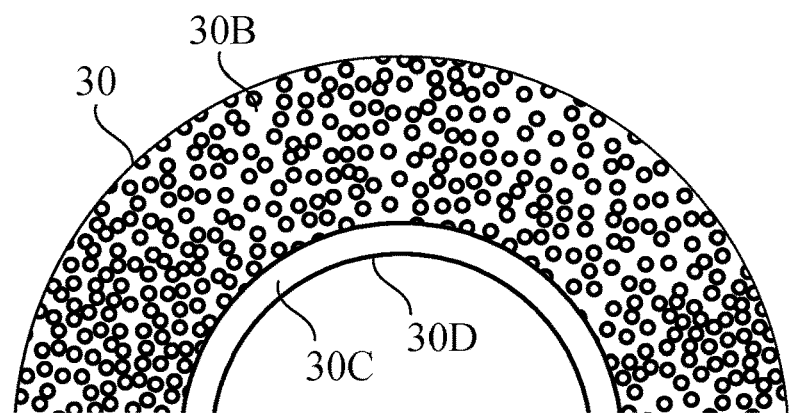
FIG. 5 is a plan view of a part of the sound insulation ring of the sealing device according to the first embodiment.

FIG. 5 is a plan view of a part of the sound insulation ring 30. As shown in FIG. 5, a large number of minute convexities and concavities are irregularly formed on the entirety of one surface of the circular annular part 30B of the sound insulation ring 30. The minute convexities and concavities can be formed by, for example, a matte finish treatment. On this surface, the distal end of the sound insulation lip 34 slides. Due to such minute convexities and concavities, the contact area between the distal end of the sound insulation lip 34 and the circular annular part 30B is reduced, so that the sound insulation lip 34 formed of an elastic material is unlikely to stick to the sound insulation ring 30, resulting that the sound insulation lip 34 can slide on the sound insulation ring 30 without receiving large resistance due to friction.

As shown in the drawing, the minute convexities and concavities may be formed on the entirety of one surface of the circular annular part 30B. Alternatively, the minute convexities and concavities may be formed only on a portion of the surface on which the sound insulation lip 34 may slide. Alternatively, the minute convexities and concavities may be formed not only in the circular annular part 30B, but also in the outer cylindrical part 30A or the protruding wall 30C.

The minute convexities and concavities may also be formed in the circular annular part 30B in other embodiments, described later.

Second Embodiment

Figure 6:
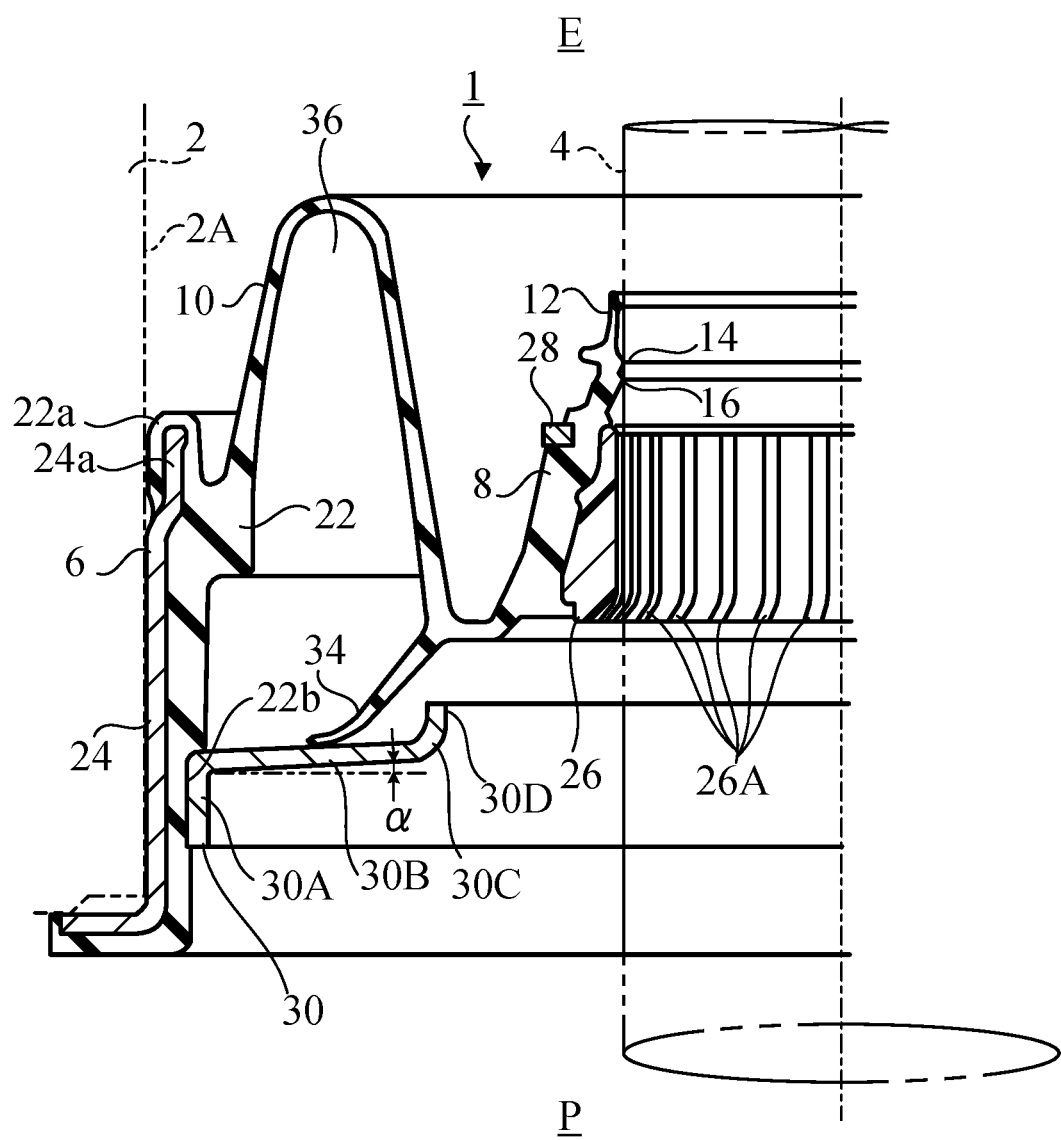
FIG. 6 is a cross-sectional view showing a sealing device according to a second embodiment of the present invention.

FIG. 6 shows a sealing device 1 according to a second embodiment of the present invention. In FIG. 6 and the subsequent figures, the same reference symbols are used for identifying components already described, and these components will not be described in detail.

In the sealing device 1 according to the second embodiment, the protruding wall 30C of the sound insulation ring 30 has a shape different from that of the first embodiment. The shape of the protruding wall 30C is not limited to the first and second embodiments, and it may be freely chosen. In the second embodiment, similar to in the first embodiment, the circular annular part 30B of the sound insulation ring 30 intersects with a plane perpendicular to the axial direction of the shaft hole 2A at an inclination angle $\alpha$.

Third Embodiment

Figure 7:
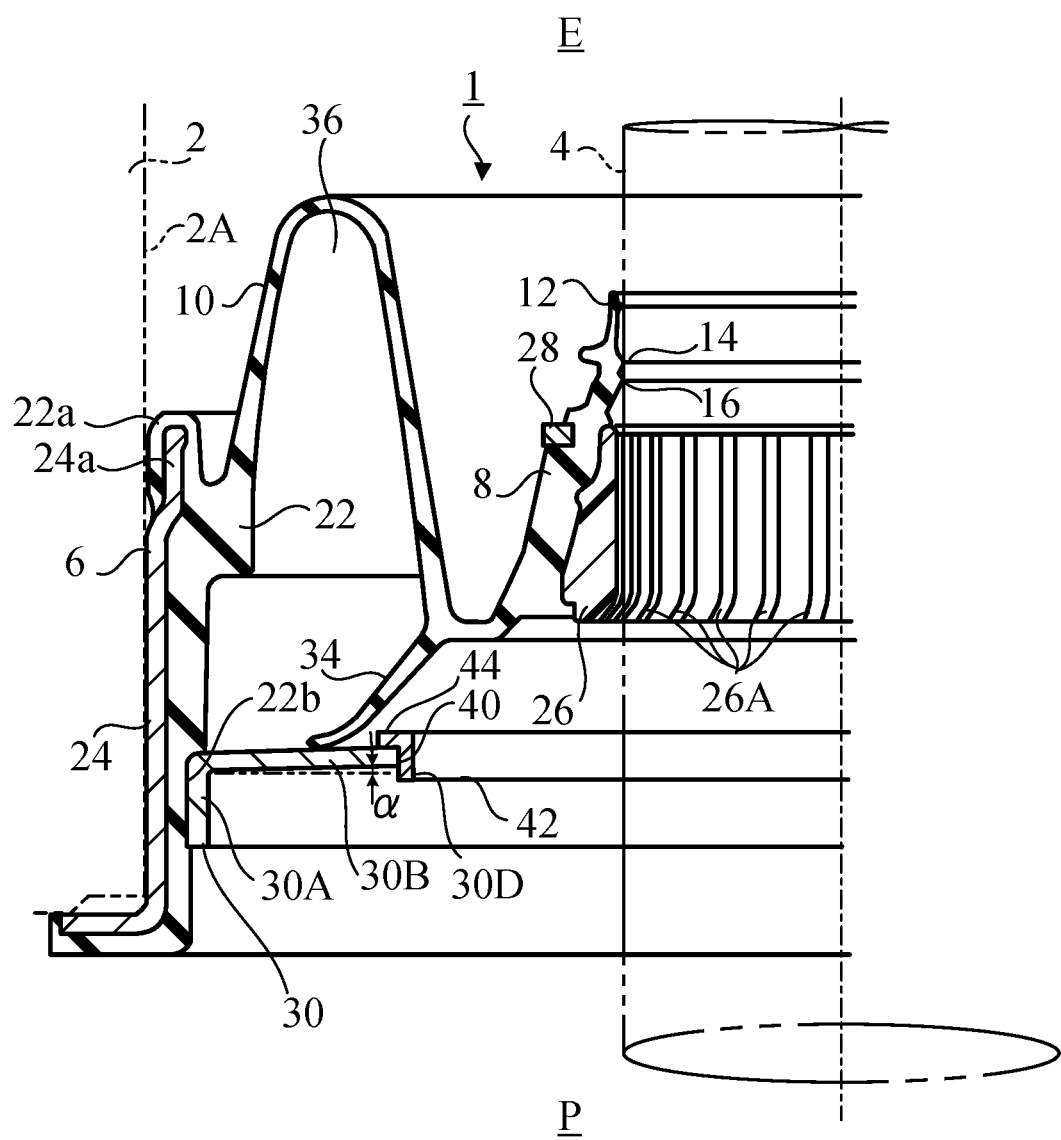
FIG. 7 is a cross-sectional view showing a sealing device according to a third embodiment of the present invention.

FIG. 7 shows a sealing device 1 according to a third embodiment of the present invention.

In the sealing device 1 according to the third embodiment, a ring 42 is fixed to an opening 40 formed at the center of the circular annular part 30B of the sound insulation ring 30. The scheme for fixing may be, for example, but is not limited to, an engagement (press fit). In the third embodiment, similar to in the first embodiment, the circular annular part 30B of the sound insulation ring 30 intersects with a plane perpendicular to the axial direction of the shaft hole 2A at an inclination angle $\alpha$.

A protruding wall 44 that plays the same role as the protruding wall 30C described above are formed on the ring 42. The protruding wall 44 is disposed radially inside the circular annular part 30B and radially outside the opening 30D, and protrudes toward the inner annular part 8. In this embodiment, the inner peripheral surface of the ring 42 constitutes the opening 30D of the sound insulation ring 30.

The ring 42 may be formed of a rigid material, such as a resin or metal, or may be formed of an elastic material, such as an elastomer.

Other Variations

Although embodiments of the present invention have been described, the foregoing description is not intended to limit the present invention. Various modifications including omission, addition, and substitution of structural elements may be made within the scope of the present invention.

For example, in the embodiments described above, the sealing device 1 is a steering dust seal, but the present invention is not limited to a steering dust seal, and is applicable to sealing devices for sealing around a rotational shaft that may be greatly eccentric and for attenuating noise.

In the above-described embodiments, the sound insulation ring 30 is provided with the protruding wall 30C or the ring 42, but the protruding wall 30C or the ring 42 is not absolutely necessary.

The invention claimed is:

1. A sealing device for sealing a gap between a housing and a rotational shaft located in a shaft hole provided in the housing, the shaft hole having an axis, the rotational shaft extending from a space on an engine compartment side to a space on a passenger compartment side, the sealing device comprising:
   an annular mounted part that is to be mounted on an inner peripheral surface of the shaft hole;
   an inner annular part located radially inside of the mounted part;
   a seal lip extending from the inner annular part and for being in contact with an outer peripheral surface of the rotational shaft;
   a bellows part connecting the mounted part with the inner annular part;
   a sound insulation ring made of a rigid material, the sound insulation ring being adapted to be arranged closer to the space on a passenger compartment side than the bellows part and the inner annular part, the sound insulation ring being fixed to the mounted part and expanding radially inward from the mounted part, the sound insulation ring comprising an opening adapted for insertion of the rotational shaft; and
   a circular annular sound insulation lip projecting from the inner annular part or the bellows part toward the sound insulation ring and comprising a distal end being in slidable contact with the sound insulation ring,
   the sound insulation lip protruding obliquely radially outward,
   the sound insulation ring comprising a circular annular part with which the distal end of the sound insulation lip is in contact,
   the circular annular part of the sound insulation ring being inclined with respect to an axial direction of the shaft hole such that a distance between an outer portion of the circular annular part and the inner annular part when projected to the axis of the shaft hole is greater than a distance between an inner portion of the circular annular part and the inner annular part when projected to the axis of the shaft hole.

2. The sealing device according to claim 1, wherein the sound insulation ring further comprises a protruding wall disposed radially inside of the circular annular part, the protruding wall protruding toward the inner annular part.

3. The sealing device according to claim 1, wherein irregular convexities and concavities are formed in a portion of the sound insulation ring with which the distal end of the sound insulation lip is in contact.

4. The sealing device according to claim 2, wherein irregular convexities and concavities are formed in a portion of the sound insulation ring with which the distal end of the sound insulation lip is in contact.

* * * * *